United States Patent [19]

Carusone, Jr. et al.

[11] Patent Number: 5,157,667
[45] Date of Patent: Oct. 20, 1992

[54] METHODS AND APPARATUS FOR PERFORMING FAULT ISOLATION AND FAILURE ANALYSIS IN LINK-CONNECTED SYSTEMS

[75] Inventors: Anthony Carusone, Jr., Tucson, Ariz.; Albert W. Garrigan, Wapppingers Falls; Wayne Hunsinger, Endwell, both of N.Y.; Gerald T. Moffitt, San Jose, Calif.; David E. Spencer, Lagrangeville; Jordan M. Taylor, Poughkeepsie, both of N.Y.

[73] Assignee: International Business Machines Corporation, Armonk, N.Y.

[21] Appl. No.: 516,387

[22] Filed: Apr. 30, 1990

[51] Int. Cl.⁵ .................................................. G06F 11/00
[52] U.S. Cl. .................................. 371/29.1; 371/16.5; 340/825.1; 455/8
[58] Field of Search .......................... 371/29.1, 16.5; 340/825.1; 370/16; 455/8

[56] References Cited

U.S. PATENT DOCUMENTS

| | | | |
|---|---|---|---|
| 3,707,714 | 12/1972 | Plumley | 371/29.1 |
| 4,108,360 | 8/1978 | Beismann et al. | 371/16.5 |
| 4,207,609 | 6/1980 | Luiz et al. | 364/200 |
| 4,396,984 | 8/1983 | Videki | 364/200 |
| 4,438,494 | 3/1984 | Budde et al. | 371/29.1 |
| 4,455,605 | 6/1984 | Cormier et al. | 364/200 |
| 4,514,846 | 4/1985 | Federico | 371/29.1 |
| 4,554,661 | 11/1985 | Bannister | 371/29.1 |
| 4,633,467 | 12/1986 | Abel et al. | 371/16.5 |
| 4,644,532 | 2/1987 | George et al. | 370/94 |
| 4,745,593 | 5/1988 | Stewart | 371/33 |
| 4,791,653 | 12/1988 | McFarland et al. | 375/116 |
| 4,881,230 | 11/1989 | Clark et al. | 370/16 |
| 4,884,263 | 11/1989 | Suzuki | 370/16 |
| 4,962,497 | 10/1990 | Ferenc et al. | 370/60.1 |

*Primary Examiner*—Robert W. Beausoliel
*Assistant Examiner*—Ly V. Hua
*Attorney, Agent, or Firm*—Michael J. Scheer; William A. Kinnaman

[57] ABSTRACT

The invention relates to methods and apparatus for isolating faults in link-connected systems utilizing fault reports generated from within the system itself. The reports are transmitted to a central location, preferably during a predetermined time period, and are used to create a single error message identifying the probable nature and location of the fault. A preferred embodiment of the invention does not require either the construction or maintenance of systemwide configuration tables, commonly used performing fault location and analysis. Instead, each unit of a pair of link coupled units, initially or on reconnection, interrogates a link adapter at the other end of the link for an identifier that identifies both the remote unit and the remote link adapter. This "nearest neighbor" information is stored locally at each unit, and is transmitted to the central location when an error is detected. The nearest neighbor information, rather than information from a configuration table, may be used to combine multiple records relating to a fault event, locate the fault and diagnose its cause. Additionally, a preferred embodiment of the invention provides a plurality of reporting paths for each unit in the system, so that the failure of a given unit or link does not prevent error information from being communicated to the central location.

27 Claims, 3 Drawing Sheets

LAID PAIRS/NEAREST NEIGHBOR INFORMATON

| LINK | LAID 1 | LAID 2 |
|------|--------|--------|
| 240  | 212-1  | 222-1  |
| 242  | 212-2  | 224-1  |
| 244  | 214-1  | 222-2  |
| 246  | 214-2  | 224-2  |
| 248  | 216-1  | 222-3  |
| 250  | 216-2  | 224-3  |
| 252  | 222-4  | 232-1  |
| 254  | 222-5  | 234-1  |
| 256  | 222-6  | 236-1  |
| 258  | 224-4  | 234-2  |
| 260  | 224-5  | 236-2  |
| 262  | 224-6  | 238-1  |

| ENTRY NO. \ UNIT INFO | CPU 212 LAID 212-1 nn 222-1 | SWITCH 222 LAID 222-1 212-1 | ANALYSIS |
|---|---|---|---|
| 501 | LOL | LOL | FAULT IN LINK 240 |
| 502 | NOS | LOL | FAULT IN PORT 1 OF CPU 212 (DRIVER) OR PORT 1 OF SWITCH (RECEIVER) |
| ETC. | | | |

FIG.4

METHODS AND APPARATUS FOR PERFORMING FAULT ISOLATION AND FAILURE ANALYSIS IN LINK-CONNECTED SYSTEMS

BACKGROUND OF THE INVENTION

1. Field of the Invention

The invention relates generally to methods and apparatus for isolating and analyzing faults in link-connected systems such as, for example, data processing systems arranged as a distributed network of host processors, switches and control units coupled by a plurality of communication links. More particularly, the invention relates to methods and apparatus for isolating faults in such systems (or networks), utilizing fault reports generated from within the system itself. The reports are transmitted to a central location, preferably during a predetermined time period, and are used to create a single error message identifying the probable nature and location of the fault. A preferred embodiment of the invention does not require either the construction or maintenance of systemwide configuration tables, commonly used in performing fault location and analysis.

2. Description of the Related Art

Various techniques are known for isolating faults in distributed networks, such as data processing systems, where the components of the system are coupled by a plurality of communication links. For example, diagnostic software may be employed to perform specific tests which can aid an operator in determining the location of a fault. Such software typically produces an error log, often containing multiple entries relating to a single fault event. An operator is usually required to analyze logged data before a conclusion can be reached regarding fault location.

U.S. Pat. No. 4,633,467 teaches a specific example of how software may be used to isolate faults in a computer system. In particular, hardware units in the system generate error reports in response to detected error conditions. A report list may be generated from the individual reports utilizing, for example, software embodying the methods taught in the referenced patent. This software not only provides a history of faults, but ages them based on elapsed time compared to a most recent fault. A weighting process is employed to help isolate faulty units.

The methods taught in the U.S. Pat. No. 4,633,467 require configuration information to be maintained and retrieved in order to implicitly determine which units are in active communication paths. These units then become the candidates for the fault location.

The end result of the analysis process taught in the U.S. Pat. No. 4,633,467 is a list which may contain multiple entries resulting from a single fault. Thus, the list needs to be analyzed by the operator to finally isolate the fault. Additionally, no diagnosis is rendered regarding the probable cause of the fault.

As indicated hereinabove, a timer-based mechanism is used in the referenced fault analysis process; however, timing is only used as a basis to exclude certain reports.

U.S. Pat. Nos. 4,727,548 and 4,745,593 disclose fault isolation systems that are similar to the one described in the U.S. Pat. No. 4,633,467. All three of these patents utilize timeout schemes in some fashion.

According to the invention disclosed in the U.S. Pat. No. 4,727,548, timeouts are used to create an activity window within which to detect faults on a signal link. If a transition does not occur within the timeout window, a fault on the link is indicated.

According to the invention described in the U.S. Pat. No. 4,745,593, a test packet is sent through the nodes of a network and a timeout scheme is used to check for an anticipated response. An error is noted if the response fails to be observed.

The inventions taught in the patents referenced hereinbefore are all prone to generate multiple error reports for a single fault; none of the references automatically integrate records to avoid multiple error messages and produce a single error message for the operator. Additionally, all of the above schemes require some type of global configuration information (like a configuration table) to be maintained in order to identify the probable source of a fault.

Still other techniques for isolating faults are set forth in U.S. Pat. Nos. 4,554,661 and 4,570,261.

The U.S. Pat. No. 4,554,661 utilizes hardware to act as a status filter to look for changes in system error status. These changes are indicative of either a detected fault or that a fault was repaired. Faults can be recognized as being inside a component, outside the component, or not isolated.

As with the software-based approaches to fault location, the hardware-based scheme taught in the U.S. Pat. No. 4,554,661 requires systemwide configuration information to be generated and maintained. Furthermore, multiple errors resulting from a single fault can still be generated and additional testing or analysis is required in such cases to isolate the fault.

In the U.S. Pat. No. 4,570,261, a voting scheme is taught which may be used to perform fault isolation. The scheme is also timer based and, similar to the timer-based aging scheme referred to above, the votes are weighted before deciding upon a possible source of the error.

The U.S. Pat. No. 4,570,261 is useful in a distributed system; however, like all the other patents cited hereinabove, configuration information, usually in the form of a configuration table, needs to be created and maintained. Multiple error reports for a single error event are also prone to be output to the operator when utilizing the teachings of the U.S. Pat. No. 4,570,261.

Furthermore, none of the techniques in the referenced patents performs an automatic synthesis of error reports in a distributed, link-connected system, to isolate and identify a single fault location, and at the same time provide a diagnosis of the cause of the fault.

It is desirable to diagnose the cause of a fault at the time a fault is located. This is particularly true when service personnel need to be dispatched (often to customer premises) to remedy a problem. Data pertaining to the probable cause of a fault, if obtained prior to dispatching service personnel, would aid in minimizing (or eliminate in part) the time and expense associated with (a) first visiting a site to determine the parts or equipment required to correct a problem, (b) returning to a central supply facility to get the parts or equipment, (c) returning to the equipment site, etc.

With the advent of optical transmission media, optoelectronic system components, etc., it is now possible to distribute the aforementioned networks over distances of up to several kilometers. Previously, when a system fault was detected there was little chance of dispatching service personnel to the wrong location since all the equipment in the system was typically separated by at most a few hundred feet and located in a common building. More recently, however, as equipment in a single network may be geographically dispersed, it is important that both fault location and analysis (relative to the cause of the fault) be performed with enough precision to send the service personnel to the right place, with the right equipment, to rectify a problem.

The ability to send service personnel to the right place with an advanced diagnosis of the cause of a fault becomes even more important when the components used in the system are subject to high failure rates.

Distributed networks of the type referred to hereinabove, provide a context in which the present invention may be used to great advantage. Such networks are typified by the system described in copending patent application Ser. No. 07/429,267, filed Oct. 30, 1989. Application Ser. No. 07/429,267 describes a switch and its protocols for making connections between one input-/output channel (of a CPU) and either another input-/output channel or a peripheral device (via a peripheral device control unit (CU)), in a data processing system. Patent application Ser. No. 07/429,267 is hereby incorporated by reference.

The system described in the incorporated copending application uses switch units installed between the CPUs and the CUs to allow connectivity from a single CPU network connection to multiple CUs, and from a single CU network connection to multiple CPUs. The bidirectional connection between two units, including the transmission medium plus the transmitters, receivers and related electronics on both ends, is called a link. The transmitter, receiver and related electronics at one end of a link is called a link attachment.

When a failure occurs on a link, symptoms occur at both ends of that link and may propagate through the switch units and appear at both ends of multiple links. The symptoms of a failure thus appear on both ends of the failing link as well as propagating to ends of non-failing links. This results in the error being detected at multiple locations. It would be desirable if these failure reports could be gathered into one place and analyzed in such a fashion as to determine which link is failing and what the probabilities are of the failure having occurred in the various elements of that link.

As indicated hereinabove, when prior art techniques are used, multiple reports from a failure result in multiple messages to operators indicating the failure, multiple failure records in multiple locations, and the possibility of multiple calls for service for the same failure. The analysis of this information and determination of what type of service should be rendered is a time consuming process.

Each switch and most CUs have multiple link attachments with paths to CPUs so that when a single path or link fails, operation and communication can continue. In most installations the CPUs communicate with each other or they may each communicate to a central location.

It would be desirable to take advantage of these multiple link attachments and the ability of CPUs to communicate with each other and/or to a central location, in networks such as the one described in the incorporated copending application, to assure failure information as seen by units in the network can be collected over not only a primary link (which itself may be faulty); but over an alternative reporting link as well.

Additionally, it would be desirable if, in such a network, multiple failure reports generated for single failures could be collected for analysis in a central location, and if a method could be provided for determining which reports belong to a specific incident without the need for a knowledge of the complete configuration of the network.

In order to analyze the multiple failure reports that occur from a single incident, it must be determined which of the failure reports received at the central point are from a single incident. A knowledge of the configuration of all of the CPUs, CUs and switches could, as indicated hereinbefore, be kept in a table, but there are difficulties in constructing such a table and dynamically keeping it up to date.

Furthermore, it would be desirable to be able to isolate a fault to a particular one of the plurality of units (or a particular link) in a network in situations where simply determining the source of a set of reports may not be enough information to isolate a fault. For example, it would be desirable to be able to identify a unit that failed and is itself unable to issue an error report.

For all of the reasons stated hereinabove, it would be desirable to provide methods and apparatus which can perform fault isolation and analysis, and which feature the ability to (a) automatically generate fault location information and a diagnosis of the probable cause of the fault; (b) provide the aforesaid information without the need to create or maintain systemwide configuration information, e.g., a system configuration table; (c) provide a way to collect error reports and isolate a fault even if a primary reporting path in a distributed link-connected system is down; (d) provide the operator with a single error message corresponding to a single failure event even when multiple error reports associated with the event are generated; and (e) precisely isolate a fault to one of a multiplicity of units (and/or links) in a distributed link coupled system.

SUMMARY OF THE INVENTION

It is an object of the invention to provide methods and apparatus which automatically generate fault location information and a diagnosis of the probable cause of the fault (in a link-connected system) using a centrally based mechanism responsive to error reports generated by the system itself, without the necessity of having to create and/or maintain systemwide configuration information.

It is a further object of the invention to provide methods and apparatus which utilize a set of predefined alternative reporting paths, in the link-connected system, to facilitate the collection of error reports at a central location should a primary reporting path for a unit be disabled.

It is still a further object of the invention to provide methods and apparatus which will, in turn, provide an operator with a single error message, corresponding to a single error event occurring in a link-connected system, even when multiple error reports associated with the error event are generated by the system.

Further yet, it is an object of the invention to provide an optional timer-based mechanism for precisely isolating a fault to one of a multiplicity of units (and/or links) in a link-connected system, whenever the failing entity itself cannot report its failure.

According to a preferred embodiment of the invention, each switch, CPU and CU in the network (like the network described in the incorporated copending patent application) has an identifier which uniquely identifies that unit. Each link adapter (attachment) of those units on the network is assigned a unique link adapter identifier (LAID) consisting of the unit ID plus a unique number (the interface ID, or port number) indicating a specific adapter on the unit.

Whenever a switch, CPU, or CU attached to the CPU/CU interface network is connected to a neighboring unit, it exchanges LAIDs with the unit on the other end of the link (sometimes referred to hereinafter as its "nearest neighbor" unit). The LAID of the nearest neighbor is then stored locally by each unit so that it will be available for transmission as part of an error report, if and when a failure occurs. Each time the possibility exists that a different unit has been connected to the system, the aforesaid identifiers are exchanged again to insure that the value saved is the identifier of the current attached link adapter.

Furthermore, according to the invention, whenever a failure occurs, failure reports are sent by each unit that observes the failure, to a central location. Each failure report includes the LAID of the link adapter that detected the failure as well as the LAID of the link adapter at the other end of the link (the previously stored LAID of the nearest neighbor). When the reports are received in the central location, the reports from the two ends of a single link can be readily identified since they each contain the same two LAIDs.

In situations where the failure has been propagated through a switch, two links become involved. In this case the two pairs of failure reports, one pair for each link, are known to be from the same failure since they have the unit identifier of the switch in common and occur in close time proximity to each other. The method and apparatus contemplated by the invention combine such error reports to easily isolate the failure in these cases.

In other situations where, for example, a unit failure occurs that causes multiple link adapters on that unit to fail, multiple reports will occur from the other ends of the links attached to those connections. Each of these multiple reports will contain the failing unit identifier. According to the invention, these reports are combined, and since the multiple failure reports indicate a single attached unit, the identified unit is presumed to have failed.

Furthermore, according to the preferred embodiment of the invention, whenever a switch or control unit attached to the CPU/CU network detects a failure at one of its link attachments to that network, it collects information on the failure as seen by that unit. The failure information is then transmitted via an alternative link attachment to any CPU. Furthermore, whenever a CPU attached to the CPU/CU interface network detects a failure at one of its link attachments to that network, it collects information on the failure as seen by that CPU. The CPUs then send the information on the failure as observed by the CPU, as well as the failure information sent to it from other units, to a common location where all of the failure reports from a single incident may be combined and then analyzed to determine on which link the failure occurred and the probabilities of the various components of that link being the cause of the failure.

The invention contemplates that a single message to an operator results from the aforesaid analysis, and that a single call can then be made (by the operator or automatically) for service. A single record for the failure can be automatically logged combining all of the reports of that failure.

Still further, the preferred embodiment of the invention contemplates performing fault location and analysis utilizing the nearest neighbor reporting concept and predefining alternative reporting links (as outlined hereinabove), combined with a timing mechanism to help isolate faults and combine records in situations such as, for example, when a unit that has failed is itself unable to report an error.

According to this embodiment of the invention, a predefined time window is established during which error reports relating to a single failure incident may be collected at the central location. The reports collected during the time period may later be analyzed. If, for example, a given unit has completely failed, the nearest neighbor(s) of the unit will have reported an error during the error report collection period (during the window). However, the failed unit itself will not report. Thus, according to this embodiment of the invention, the timer-based mechanism may be used to assign a high degree of probability of failure to any unit that has an alternative reporting path and does not report during the predetermined time period when its nearest neighbor(s) report an error.

Many alternative embodiments of the invention are also contemplated. For example, where the aforesaid timer based mechanism is used in conjunction with a configuration table; where the nearest neighbor concept is used with or without a timer-based mechanism; where the nearest neighbor concept is used with or without alternative reporting paths, etc.

The invention features automatic generation of fault location information along with a diagnosis of the probable cause of a fault, all communicated to an operator via a single error message. Furthermore, the invention features the ability to analyze and diagnose system failures without having to create or maintain system configuration tables.

Still further, the invention features mechanisms for precisely isolating a fault to one of a multiplicity of units (and/or links) in a link-connected system even when a faulty unit is itself unable to report, and in situations where the primary reporting path for a faulty unit is disabled.

These and other objects and features of the present invention, and the manner of obtaining them, will become apparent to those skilled in the art, and the invention itself will be best understood, by reference to the following detailed description read in conjunction with the accompanying Drawing.

BRIEF DESCRIPTION OF THE DRAWING

FIG. 4 is an example of the contents of a table that can be used, in accordance with the principles of the invention, to generate a single error message indicating both the location and probable cause of a fault.

DESCRIPTION OF THE PREFERRED EMBODIMENT

Figures 1, 3:
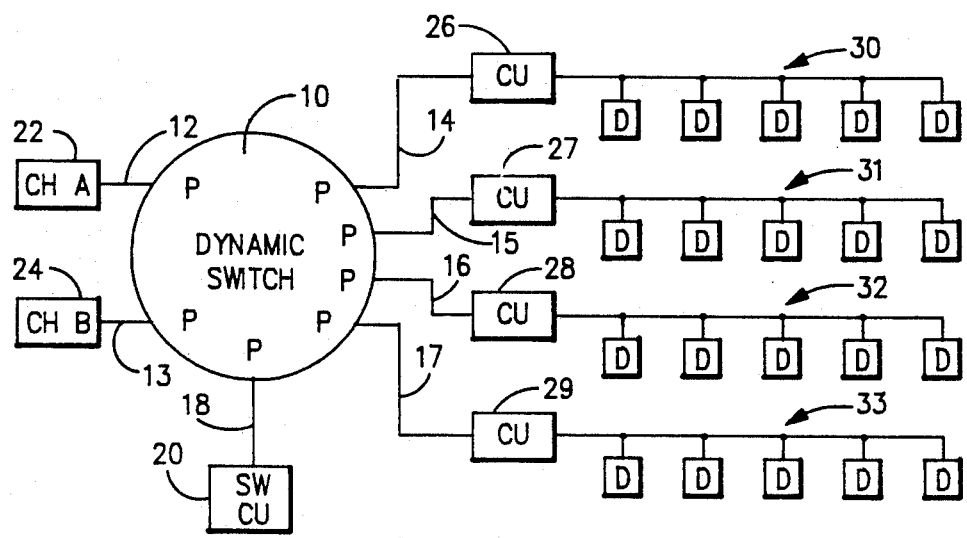
FIG. 1 is a block diagram of a distributed network, in particular a computer system having a plurality of channels connected to a plurality of control units, through a dynamic switch, via a plurality of links.
FIG. 3 is a table which, for the links depicted in FIG. 2, indicates the unique link adapter ID (LAID) for the link adapters that are "nearest neighbors", i.e., that are located on opposite ends of a given link.

FIG. 1 depicts a block diagram of the I/O subsystem of a data processing system for making dynamic connections between the channel subsystem of the data processing system and a set of control units. The details of how such a system operates are fully set forth in the referenced copending application. However, for the sake of completeness, a portion of this information will be reviewed herein.

The I/O subsystem depicted in FIG. 1 includes a dynamic switch 10 having a plurality of ports P, each port P connected to one end of a plurality of links 12-18. One of the links, 18, is connected to a dynamic switch control unit 20, and each of the other links 12-17 is connected to either a channel, such as channel A designated 22 or channel B designated 24, or to one of the control units 26-29. Each of the control units 26-29 control a plurality 30-33 of peripheral devices D, respectively.

Each of the channels 22 and 24 could, for example, be a single interface on a commercially available IBM System/370-XA channel subsystem. The channels 22 and 24 direct the transfer of information between I/O devices of the pluralities 30-33 of devices D and main storage (not shown) of the data processing system and provide the common controls for the attachment of different I/O devices D by means of a channel path, as defined in the incorporated copending patent application. The channels 22 and 24 are serial channels wherein data is transmitted and received in a serial format. This is also explained in the referenced copending patent application.

Each of the links 12-17 is a point-to-point pair of conductors that may physically interconnect a control unit and a channel, a channel and a dynamic switch (such as links 12 and 13), a control unit and a dynamic switch (such as links 14-17), or , in some cases, a dynamic switch and another dynamic switch.

The two conductors of a link provide a simultaneous two-way communication path, one conductor for each direction of transmission. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The conductors of a link in the system depicted in FIG. 1 are not limited to electrical conductors. For example, link-connected systems may employ optical fibers instead of electrical conductors, to interconnect optoelectronic components.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in U.S. Pat. Nos. 4,605,928; 4,630,045; and 4,635,250 (the "switch" patents), incorporated into the referenced copending patent application.

When a connection is established, two dynamic switch ports and their respective point-to-point links are interconnected by a switch matrix within the dynamic switch 10, as explained in the aforementioned switch patents, such that the two links are treated and appear as one continuous link for the duration of the connection. When transmitted frames of information are received by one of two connected switch ports P, the frames are normally passed from one port to the other for transmission on the other port's link.

Communications using the switch depicted in FIG. 1 are governed by two hierarchical levels of functions and serial-I/O protocols, the link level and the device level. Link level protocols are used whenever a frame is sent. These protocols determine the structure, size, and integrity of the frame. Link protocols also provide for making the connection through the dynamic switch 10 and for other control functions which are unrelated to this invention. Each channel and each control unit contains a link-level facility, which is the embodiment of the link protocols. The device level is used to convey application information such as the data which is transferred from an input-output device to the channel. A frame which contains application information or controls is called a device-level frame. A frame which is used solely for link level protocol is called a link-control frame. Examples of both frame types are set forth in the incorporated copending patent application.

Each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

Figure 2:
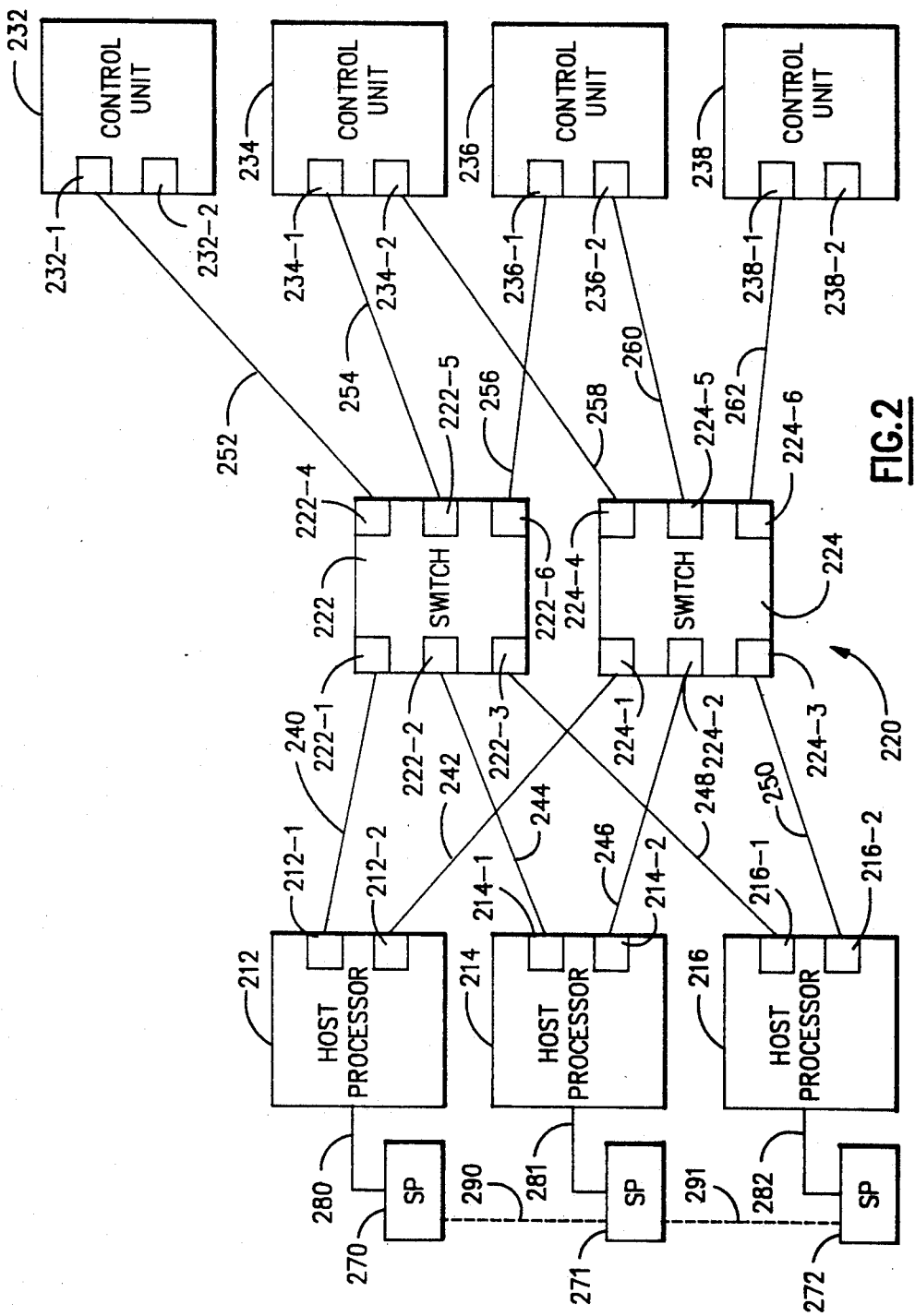
FIG. 2 is a block diagram that is similar to the one shown in FIG. 1, except that three processors, each having an associated service processor, are shown coupled to four control units via two switches. A set of link attachments (adapters) for these units are depicted along with their corresponding unique link adapter IDs (LAID numbers).

FIG. 2 is a block diagram that is similar to the one shown in FIG. 1, except that three processors (212, 214 and 216) are shown coupled to four control units (232, 234, 236 and 238), via two switches (222 and 224), and a set of link attachments (adapters) for these units, along with their corresponding unique link adapter IDs (LAID numbers) are also shown. FIG. 2 also shows a plurality of service processors (SPs) 270-272, coupled to host processors (CPUs) 212, 214 and 216 respectively, via links 280-282. The purpose of these service processors and their depicted interconnection (via dotted lines 290 and 291) will be explained hereinafter.

The table depicted in FIG. 3 is a summary of the LAID numbers associated with the ends of each of the links depicted in FIG. 2.

According to one embodiment of the invention, the LAID pair associated with each link forms the "nearest neighbor" information that can be used to advantage in generating error reports without requiring a system-wide configuration table to be created or maintained.

Each LAID number shown in FIGS. 2 and 3 can be seen to be the combination of a given unit ID plus a unique number (the interface ID, or port number, as noted above) indicating a specific adapter on the given unit.

In particular, referring again to FIG. 3, it can be seen that the nearest neighbor information for the units coupled, for example, by link 256, is the LAID pair 222-6 and 236-1. Again, each line of the table depicted in FIG. 3 shows the nearest neighbor information for the units on the opposite ends of each of the links listed. It will be demonstrated hereinafter how, according to a preferred embodiment of the invention, this nearest neighbor information may be utilized for fault location and analysis.

According to the preferred embodiment of the invention, whenever any of the units in FIG. 2 is first interconnected to a neighboring unit, LAIDs are exchanged and stored. The means for doing so already exists in the system described in the referenced copending patent application since the individual LAID numbers exist and only need to be stored locally at each unit.

Thus, continuing with the illustrative example involving switch unit 222 interconnected with CU 236, LAID pair 222-6 and 236-1 is stored at each end of link 256 (i.e., locally in the units attached to link 256) when the initial attachment of these units is made, so that the nearest neighbor information will be available for transmission as part of an error report if and when a failure occurs.

According to the preferred embodiment of the invention, each time the possibility exists that a different unit has been connected (via a link) to the system, LAIDs are exchanged across the connecting link and stored for future use as indicated hereinbefore.

Furthermore, according to the invention, whenever a failure occurs, failure reports are sent by each unit that observes the failure, to a central location. For the sake of illustration, service processor 272 could be designated as the central location. As a further example, the service processors could be interconnected via links 290 and 291 (as shown in FIG. 2) to LAN to which a PC for processing error reports is attached, etc.

The invention contemplates means for generating a single fault message, from the error reports transmitted to the central location, to be operational at the central location. Such means will be explained in greater detail hereinafter with reference to FIG. 4. For now however, it should be understood that each failure report is transmitted to a central location and that each failure report includes the LAID of the link adapter that detected the failure as well as the LAID of the link adapter at the other end of the link (the previously stored LAID of the nearest neighbor to the unit reporting a failure).

When the reports are received in the central location, the reports from the two ends of a single link can be readily identified since they each contain the same two LAIDs.

Continuing with the illustrative example, if link 256 of FIG. 2 suffers a failure, the invention contemplates the LAID pair 222-6 and 236-1 being somehow transmitted to a central location (such as service processor 272) from both switch unit 222 and CU 236. Clearly, the LAID pair from switch unit 222 can be communicated over presumably sound links; however, the LAID pair from CU 236 will need to be communicated via some alternative path as will be explained hereinafter.

In situations where the failure has been propagated through a switch, two links become involved. Thus, considering a different example, if the failure exists on the path from host processor 214 to CU 238 of FIG. 2, links 246 and 262 become involved. In this case the two pairs of failure reports, one pair for each link, are presumed to be from the same failure since they have the unit identifier of the switch (switch 224) in common and occur in close time proximity to each other. The method and apparatus contemplated by the invention combine such error reports to easily isolate the failure in these cases, after transmission of the LAID pairs to the central location.

In other situations where, considering yet another example, a unit failure occurs (e.g., switch 222), multiple link adapters on the unit will fail and multiple reports will occur from the other ends of the links attached to those connections (from all the units attached to switch 222 for this example). Each of these multiple reports will contain the failing unit identifier. According to the invention, these reports may be combined at the central location (after being reported to the location) by the means for generating a single fault message. Since the multiple failure reports indicate a single attached unit, the identified unit is presumed (by the means for generating a single fault message) to have failed.

Furthermore, according to the preferred embodiment of the invention, whenever a switch or control unit attached to the CPU/CU network detects a failure at one of its link attachments to that network, it too collects information on the failure as seen by that unit. The failure information may then be transmitted via an alternative link attachment to any CPU.

Thus, for the example set forth hereinbefore, relative to the failure of link 256, the invention contemplates the preassignment of an alternative link (such as link 260) on which to transmit failure information. It is by such means that the failure information transmitted by CU 236 can get back to the central point (such as service processor 272 in the illustrative example) even when link 256 is inoperative. In the instant example, CU 236 can communicate with SP 272 via links 260, 250, 282 and units 216 and 224.

Furthermore, whenever a CPU (host processor) attached to the CPU/CU interface network detects a failure at one of its link attachments to that network, it collects information on the failure as seen by that CPU. The CPUs then send the information on the failure as observed by the CPU, as well as the failure information sent to it from other units, to the common location where all of the failure reports from a single incident may be combined and then analyzed to determine on which link the failure occurred and the probabilities of the various components of that link being the cause of the failure. Thus, following the illustrative example further, error information on the failure of link 256 may also be reported to SP 272 via CPU 212.

Still further, the preferred embodiment of the invention contemplates performing fault location and analysis utilizing the nearest neighbor reporting concept and predefining alternative reporting links (as illustrated hereinabove), combined with a timing mechanism to help isolate faults and combine records in situations such as, for example, when a unit that has failed is itself unable to report an error. The timing mechanism is preferably embodied in the means for generating the single fault message from the error reports.

According to a preferred embodiment of the invention, the error reports themselves may be simply structured. Not only should each report include information indicating the reporting unit and its link-attached neighbor; but an indication of observed failure symptoms should be communicated as part of the report as well.

One form of providing this information to a central location would be to transmit the LAID pair (i.e., the nearest neighbor information) stored at the reporting unit. An alternative way of providing this information would be for the reporting unit to supply its own ID and relevant link information to the central location where a table look up could be performed (using a dynamically maintained configuration table) in order to determine connectivity (i.e., the neighboring unit to which the reporting unit is connected).

As for fault symptoms, depending on the nature of the link-connected system (for example, fiber optic, electrical, etc.), indications such as loss of light (LOL), a signalled nonoperational sequence (NOS) indicating that the link is nonoperational due to a failure, etc., are contemplated as being transmitted as part of an error report.

According to this preferred embodiment of the invention, a predefined time window is established during which error reports relating to a single failure incident may be collected at the central location. In one specific embodiment of the invention, three minutes was chosen as the length of the interval and provides more than adequate time to gather information on a single fault.

The length of the interval is not meant to be a limiting factor relative to the invention. Neither is the specific manner in which the error reports are collected and analyzed. A preferred method for collecting and analyzing error reports will subsequently be set forth with reference to FIG. 4.

The preferred method for collecting and analyzing faults deals with providing the solution to a simple problem, namely determining, whenever two ends of a link see a failure, which end of the link (or if the link itself) caused the failure. Reference should again be made to FIG. 2 in which two exemplary units, 216 and 224, coupled by link 250, may be used to illustrate the preferred process of collecting and analyzing faults.

According to the invention, if the logic in unit 216 causes link 250 to fail, units 216 and 224 would both report a failure of link 250 to a central location. Also, if unit 224 causes the link to fail, two reports will again result and be transmitted to the central location. It should also be noted that if link 250 itself suffers a failure, once again two failure reports will be generated.

The symptoms reported by units 216 and 224 will likely be different for different causes of a failure. According to the invention the two reports from units 216 and 224 are combined into a state table, and knowing the different symptoms, the combined information (based on experience) can lead to a single report providing isolation to a unit or a link, allowing the system to tell an operator to send repair personnel to the proper location armed with a diagnosis of the problem.

According to a preferred embodiment of the invention, the combination of reports is performed using the optional timing mechanism. When any report reaches the place where the state table is located (e.g., on a PC coupled to a LAN to which a set of service processors are attached, etc.) a timer is started. When a timer expires, the reports that have been received during that time period are examined to see which of them correlates with the report for which the timer expired. The preferred method for correlating reports with the timed out report is via LAID information. Other correlation rules, however, may also be used. The reports that correlate are gathered together for analysis, which may be in conjunction with the table, in the manner described hereinafter, to provide an experience-based diagnosis of the error event. The timers for all of those correlated and analyzed are stopped. The timers for any other reports gathered during that period continue. When each of those timers time out, the same process is followed.

The table itself can be constructed from common experience. For example, if the units attach on either side of a link both experience a loss of light (in a fiber optic system), it can safely be assumed that the link itself is either broken or disconnected. As a further example, if one unit observes a loss of light (LOL), while the other unit observes a nonoperational sequence (NOS) generated by the first unit upon observing a loss of light, then the link is operational and the problem would likely be found in the driver of the unit observing the NOS, or in the receiver of the unit observing the LOL.

The table depicted in FIG. 4 contains several illustrative entries, two of which (entries 501 and 502) correspond to the aforestated examples, of an experience based table that can be used in conjunction with reported symptoms and IDs to provide a single error message (and a diagnosis) to an operator.

The optional timing mechanism may also be used to great advantage when a unit in the link-coupled system fails completely. Here again, the invention contemplates asynchronous reporting of error information, the collection of error reports during a predefined window, and the use of an algorithm indicating that a unit which is the neighboring unit in multiple reports is probably the failing unit.

The means for generating a single fault message may, for example, be realized by a computer program, hardware or some firmware entity, operative to relate the reports, synthesize them (preferably using nearest neighbor information), etc. Suitable method steps for implementing the means for generating a single fault message, in accordance with the teachings of the invention, will be set forth herein.

Using the timing mechanism referred to hereinabove, the means for generating a single fault message can, for example, stop trying to match up nearest neighbors in a situation where the failed neighbor will never send an error report. Clearly, where a given unit has completely failed, the nearest neighbor(s) of the unit will have reported an error during the error report collection period (during the window). However, the failed unit itself will not report.

Thus, according to this embodiment of the invention, the timer-based mechanism may be used to assign a high degree of probability of failure to any unit that does not report during the predetermined time period when its nearest neighbor(s) report an error.

In particular, the aforementioned method can, as indicated hereinbefore, be implemented by software, hardware, microcode or some combination of software, hardware and microcode. Using software as an example, the program embodying the method could run on a PC coupled to the aforementioned LAN, could run on a Service Processor, or even on one of the host processors depicted in FIG. 2.

As the interval timer elapses for each report received, the means for generating the single fault message can gather related reports by, for example, matching nearest neighbor information (the preferred scenario), or by using other matching algorithms, utilizing techniques well known to those skilled in the art. After gathering related reports, a synthesized error record is produced using a table lookup (using the aforementioned state table) or using additional algorithms, utilizing techniques well known to those skilled in the art. A single error message can then be produced containing both an indication of the fault location and an experience-biased diagnosis of the problem from the synthesized error record.

FIG. 4 depicts an example of the contents of a state table that can be used, in accordance with the principles of the invention, for generating a single fault message.

In particular, a state table such as the one depicted in FIG. 4 as table 500 is shown to include a plurality of entries (501, 502, etc.), indicating symptoms reported in error messages transmitted by the units shown along the top of the table. For example, entry 501 reflects (in part) an LOL reported by CPU 212 of FIG. 2.

The headings at the top of table 500 indicate that the transmitted error report included nearest neighbor information, in particular the LAID pair 212-1 and 222-1 for the entry under CPU 212. Also shown as part of entry 501 is the substance of a report received from switch 222. The report from switch 222 also indicated LOL and the nearest neighbor information transmitted was LAID pair 222-1, 212-1. These two reports had matching LAID numbers and were thus grouped into one entry of the table.

The table was constructed so that the two LOL symptoms result in an analysis that cable 240 (interconnecting CPU 212 and switch 222) is faulty, since experience dictates that whenever interconnected units each observe LOL, the interconnecting medium is faulty.

Entry 502 could have similarly been constructed using the nearest neighbor information provided by CPU 212 and switch 222. In this case however, the NOS observed by CPU 212 and the LOL observed by switch 222 would result in an experience-based diagnosis that the driver associated with port 1 of CPU 212 is faulty or that the receiver associated with port 1 of switch 222 is faulty.

The examples set forth hereinabove illustrate the principles of operation of the invention. Obviously, many variations and modifications will be clear to those skilled in the art. For example, instead of a predefined time window, a certain number of entries may be collected before processing data that involves only one reporting unit when at least one other unit is expected to report; the depicted state table could be utilized in conjunction with a configuration table rather than with nearest neighbor information; table entries could be created for a variable number of alternative reporting paths depending on the amount of redundancy one wishes to design into the system, etc.

What has been described are methods and apparatus for performing fault isolation and failure analysis in link-connected systems meeting all of the objectives set forth hereinbefore. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. Apparatus for isolating and analyzing faults in a link-connected system, utilizing fault reports generated from within the system itself, wherein said system comprises a plurality of units interconnected by a plurality of links, and further wherein said units are coupled to a central reporting location, comprising:
   (a) means for detecting faults as they occur in the system;
   (b) means for transmitting reports of detected faults to said central location, said transmitting means providing, as part of at least one of said fault reports, nearest neighbor information;
   (c) means for associating fault reports transmitted to said central location utilizing said nearest neighbor information; and
   (d) means for generating a single error message from associated fault reports.

2. Apparatus as set forth in claim 1 wherein said transmitting means further comprises means for generating at least one fault report for each detected fault, wherein each report includes at least an identification of the unit reporting the fault, an identification of the link on which a fault was detected by the reporting unit, and an indication of any detected fault symptoms.

3. Apparatus as set forth in claim 2 wherein said means for generating a single error message from associated fault reports is operative to both isolate and diagnose the cause of a fault based at least in part on said indication of detected fault symptoms.

4. Apparatus as set forth in claim 1 wherein said means for associating detected faults is operative to collect fault reports during a predetermined time period.

5. Apparatus as set forth in claim 4 wherein said means for associating detected faults is further operative to perform fault report association on those reports collected during said predetermined time period.

6. Apparatus as set forth in claim 4 wherein said predetermined time period commences with the receipt and collection of a fault report at said central location.

7. Apparatus as set forth in claim 1 wherein said nearest neighbor information further comprises at least one pair of link adapter identifiers (LAIDs), wherein the first identifier in each LAID pair identifies both the transmitting unit and link adapter on the transmitting unit that is coupled to a given link on which a fault is detected, and further wherein the second identifier in each LAID pair identifies the unit and link adapter attached to the opposite end of said given link.

8. Apparatus as set forth in claim 1 wherein said transmitting means includes at least one of the link-coupled units of said system.

9. Apparatus as set forth in claim 1 wherein said transmitting means includes at least a pair of link-coupled units of said system.

10. Apparatus as set forth in claim 1 wherein said transmitting means further comprises a set of predefined primary or alternative reporting paths for each unit in said system.

11. Apparatus as in claim 1 in which each of said units comprises means responsive to the loss of an incoming signal on a link for transmitting a predetermined outgoing signal on said link.

12. Apparatus as in claim 11 in which said message generating means, in response to the receipt of a first fault report from a unit at one end of a link indicating the loss of an incoming signal on said link and a second fault report from a unit at the other end of said link indicating the presence of said predetermined signal on said link, generates an error message indicating the receiver at said one end of said link or the driver at said other end of said link as a probable fault source.

13. Apparatus as in claim 1 in which said links are fiber optic links, each of said units comprising means responsive to the loss of incoming light on a link for generating a predetermined outgoing sequence on said link.

14. Apparatus as set forth in claim 1 wherein said means for associating fault reports comprises:
 (a) means for collecting fault reports during a predetermined time period; and
 (b) means for associating fault reports collected during said predetermined time period utilizing said nearest neighbor information.

15. Apparatus for isolating and analyzing faults in a link-connected system, utilizing fault reports generated from within the system itself, wherein said system comprises a plurality of units interconnected by a plurality of links, and further wherein said units are coupled to a central reporting location, comprising:
 (a) a plurality of link adapters associated with said plurality of units for attaching said units to said plurality of links, each link adapter having a unique link adapter identifier (LAID) assigned thereto;
 (b) means for locally storing at each unit the LAID of each adapter at a given unit that is coupled to a link, along with the LAID of each remote adapter coupled to said given unit, so as to form locally stored LAID pairs of nearest neighbor information for each link-coupled link adapter of each unit;
 (c) means for transmitting fault reports containing said nearest neighbor information, along with any detected fault symptoms, from each unit observing a fault to said central location;
 (d) means for storing said fault reports at said central location;
 (e) means for associating said stored fault reports utilizing said nearest neighbor information; and
 (f) means for generating a single error message from associated fault reports.

16. A method of isolating faults in a link-connected system comprising the steps of:
 (a) detecting faults as they occur in said system;
 (b) transmitting reports of the detected faults to a reporting location, at least one of said reports including nearest neighbor information relative to the transmitting unit;
 (c) associating those fault reports transmitted to said location utilizing said nearest neighbor information to determine which reports are related to a particular error event;
 (d) generating a single error message from the associated fault reports relating to said particular error event, wherein said message includes fault isolation and diagnostic information.

17. A method as set forth in claim 16 wherein said step of associating is performed within a predetermined time period.

18. A method as in claim 16 in which said step of associating further comprises the steps of:
 (a) beginning a data-gathering interval in response to the receipt of a fault report at said reporting location;
 (b) ending said data-gathering interval upon the lapse of a predetermined time period following the beginning of said interval; and
 (c) associating those reports received at said location within said interval.

19. A method as in claim 18 in which an interval is started upon the receipt of each report.

20. A method as set forth in claim 16 wherein said step of transmitting is performed by each unit in said system that detects a fault, and further wherein each fault report includes at least an identification of the unit transmitting the fault report, an identification of the link on which a fault was detected by the transmitting unit, and an indication of any detected fault symptoms.

21. A method as set forth in claim 16 wherein said step of transmitting further comprises the step of attempting to transmit each report over a predefined primary or alternative reporting path to said reporting location.

22. A method of isolating faults in a network of units interconnected by links, each link coupling a pair of units via respective link adapters associated with said units, each of said link adapters having a unique identifier distinguishing it from the other link adapters of said network, said method comprising the steps of:
 (a) transmitting a fault report to a reporting location in response to the detection of a fault by a link adapter, said fault report including at least any detected symptoms of said fault, the identifier of the link adapter detecting said fault, and nearest neighbor information in the form of the identifier of the link adapter at the opposite end of the link to which the link adapter detecting said fault is attached;
 (b) associating fault reports transmitted to said reporting location utilizing said nearest neighbor information; and
 (c) generating a single error message from said associated fault reports.

23. A method as set forth in claim 22, further comprising the step of transmitting the identifier of each of said link adapters to the link adapter at the other end of each link coupling a pair of units.

24. A method as set forth in claim 22 wherein said identifier has a first portion identifying the unit and a second portion identifying the link adapter of that unit.

25. A method as in claim 22 in which said step of generating further comprises the steps of:
 (a) beginning a data-gathering interval in response to the receipt of a fault report at said reporting location;
 (b) ending said data-gathering interval upon the lapse of a predetermined time period following the beginning of said interval; and
 (c) generating said message from the reports received within said interval.

26. Apparatus for isolating and analyzing faults in a link-connected system having a plurality of units coupled to a central reporting location and links coupling respective pairs of said units, said units having respective unit identifiers associated therewith, said apparatus comprising:
 means for locally storing at each unit the unit identifier associated with said unit, along with the unit identifier of each unit directly attached to said unit by a link, so as to provide for each such link nearest neighbor information comprising a locally stored pair of unit identifiers identifying said link;

means responsive to the detection of a fault on a link by a unit attached to said link for transmitting a fault report containing said nearest neighbor information to said reporting location; and means for associating fault reports transmitted to said reporting location utilizing said nearest neighbor information.

27. Apparatus as in claim 26 in which said units are attached to said links via respective interfaces having interface identifiers associated therewith, each of said units locally storing the interface identifiers associated with the interfaces of said unit, along with the interface identifiers of each interface directly attached to said unit by a link, so as to provide for each such link nearest neighbor information comprising a locally stored pair of interface identifiers identifying said link.

* * * * *